(12) United States Patent
Vrazic

(10) Patent No.: US 10,049,157 B2
(45) Date of Patent: Aug. 14, 2018

(54) SIREN SIGNAL SOURCE DETECTION, RECOGNITION AND LOCALIZATION

(71) Applicant: AISIN SEIKI KABUSHIKI KAISHA, Kariya-shi, Aichi-ken (JP)

(72) Inventor: Sacha Vrazic, Munich (DE)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 418 days.

(21) Appl. No.: 14/844,754

(22) Filed: Sep. 3, 2015

(65) Prior Publication Data

US 2016/0070788 A1    Mar. 10, 2016

(30) Foreign Application Priority Data

Sep. 4, 2014    (DE) .................. 10 2014 217 681

(51) Int. Cl.
*G06F 17/30* (2006.01)
*H04R 3/00* (2006.01)

(52) U.S. Cl.
CPC .. *G06F 17/30743* (2013.01); *G06F 17/30752* (2013.01); *H04R 3/005* (2013.01)

(58) Field of Classification Search
CPC ......... G06F 17/30743; G06F 17/30752; H04R 3/005
See application file for complete search history.

(56) References Cited

U.S. PATENT DOCUMENTS

| 8,319,620 | B2 | 11/2012 | Usher et al. |
| 2012/0069714 | A1 | 3/2012 | Nakadai et al. |
| 2012/0232895 | A1 | 9/2012 | Suzuki et al. |
| 2016/0070788 | A1* | 3/2016 | Vrazic .............. G06F 17/30743 707/769 |

FOREIGN PATENT DOCUMENTS

| DE | 102007028400 B3 | 1/2002 | |
| DE | 10060017 A1 | 6/2002 | |
| DE | 102013016344 A1 | 4/2014 | |
| JP | 2012-042465 A | 3/2012 | |
| JP | 2012-189906 A | 10/2012 | |
| JP | 2012-215606 A | 11/2012 | |
| JP | 2016057295 A * | 4/2016 | ........ G06F 17/30743 |

OTHER PUBLICATIONS

Communication dated Jun. 15, 2015 issued by the German Patent Office in corresponding German Application No. 10 2014 217 681.6

* cited by examiner

*Primary Examiner* — Daniel Pihulic

(74) *Attorney, Agent, or Firm* — Sughrue Mion, PLLC

(57) ABSTRACT

A system comprises a microphone unit to be mounted in a first vehicle, which receives an audio signal from outside the first vehicle, processes the audio signal and outputs a microphone signal, a storage unit which stores a database containing, for each siren signal pattern of a plurality of siren signal patterns sounded by second vehicles, components of sparse models respectively corresponding to the plurality of siren signal patterns, and an identifying unit which matches the microphone signal with the components of the sparse models, and detects, based on a result of the matching, at least one of the second vehicles sounding a siren signal pattern of the plurality of siren signal patterns. According to an embodiment, the system further comprises a localizing unit which localizes the at least one second vehicle based on differences between timings of at least three microphone signals output from the microphone unit.

19 Claims, 8 Drawing Sheets

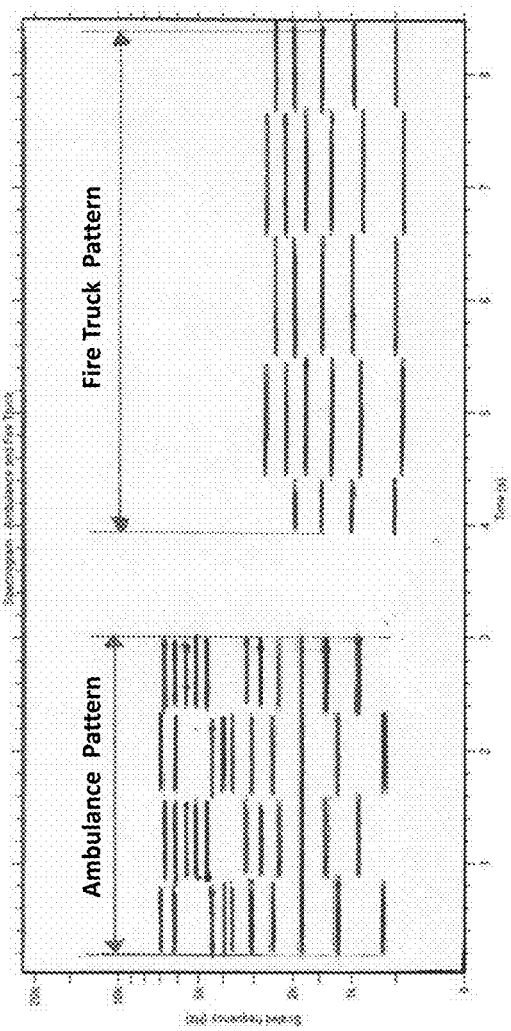

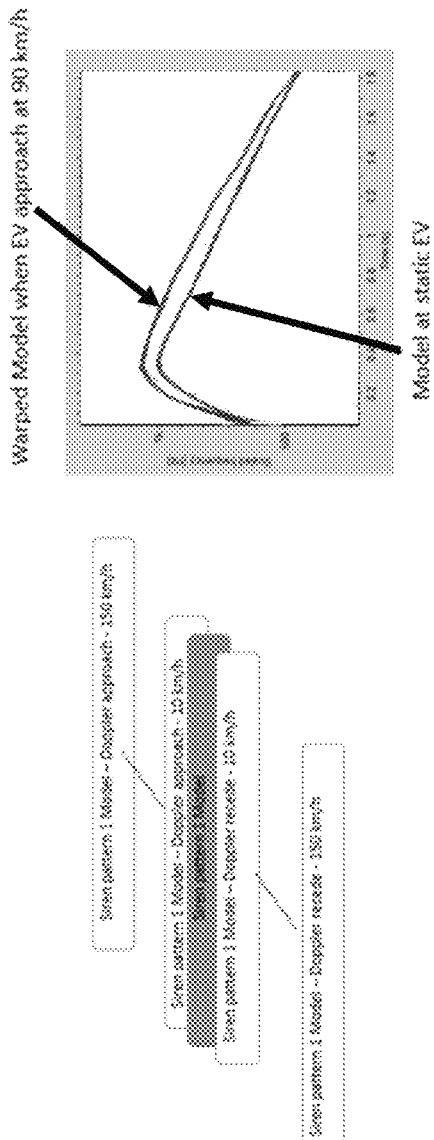
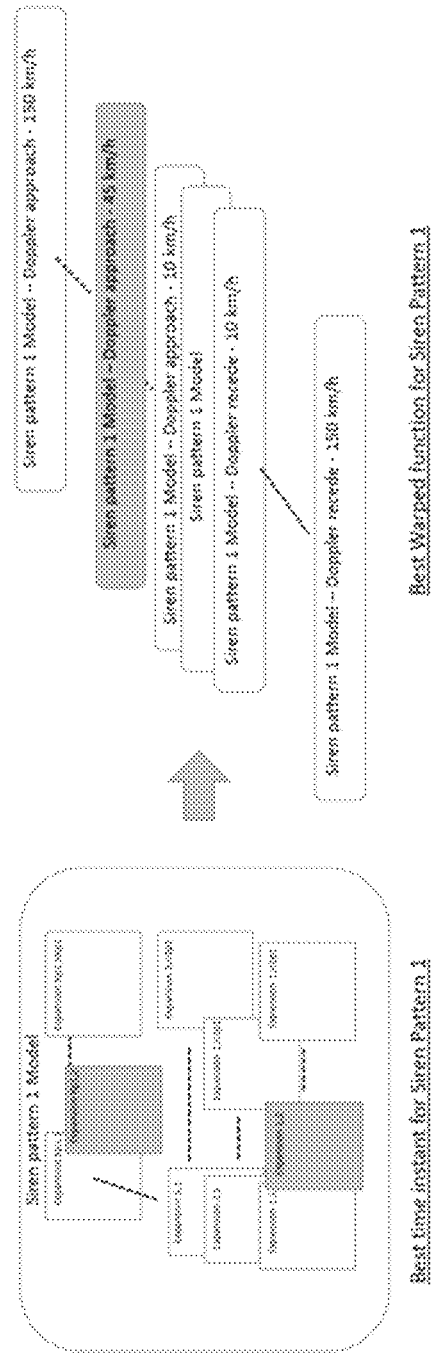
Fig. 10
Fig. 11

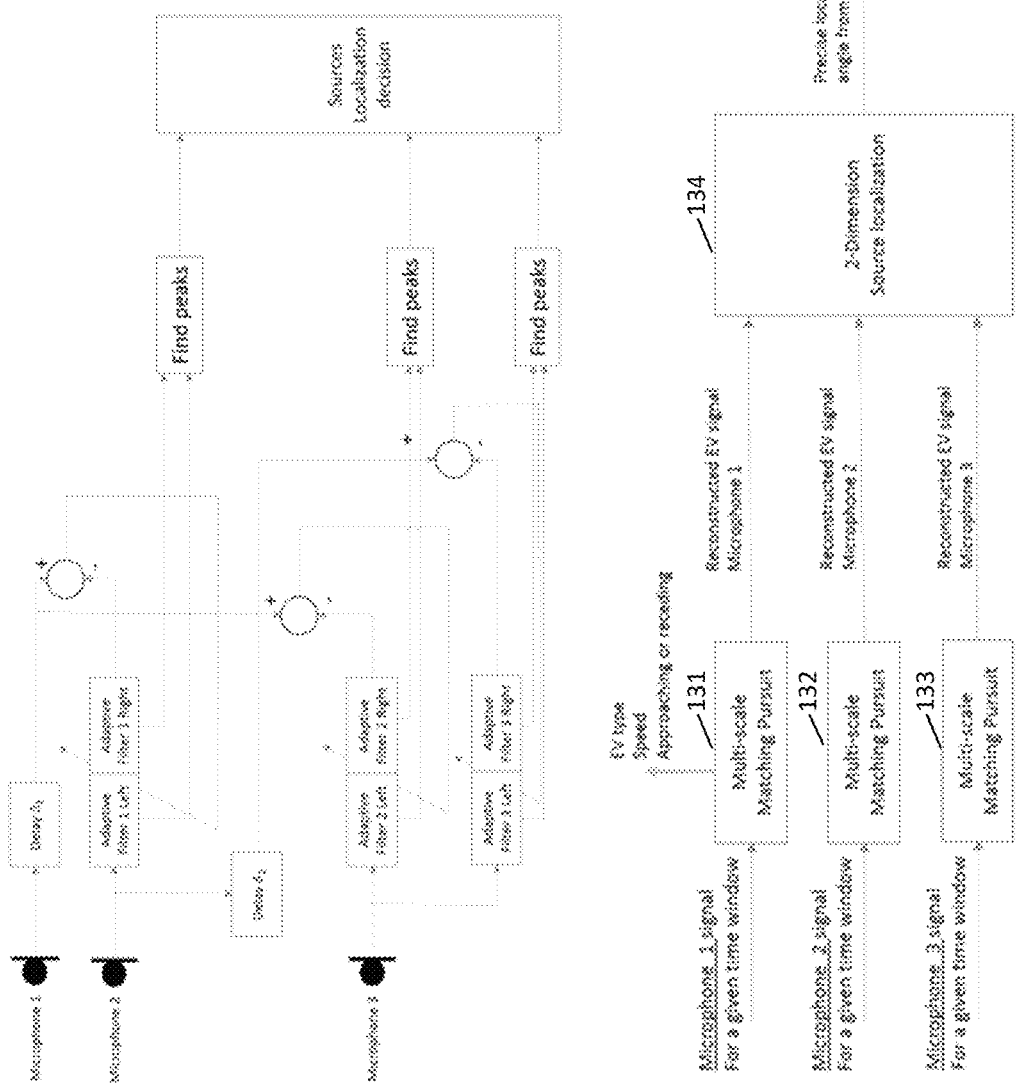

SIREN SIGNAL SOURCE DETECTION, RECOGNITION AND LOCALIZATION

CROSS REFERENCE TO RELATED APPLICATIONS

This application is based on and claims priority under 35 U.S.C. § 119 to German Patent Application 102014217681.6, filed on Sep. 4, 2014, the entire content of which is incorporated herein by reference.

TECHNICAL FIELD

The present invention relates to siren signal source detection, recognition and localization. In particular, the invention relates to detecting, recognizing and localizing emergency vehicles (EVs) by using acoustic sensors.

BACKGROUND DISCUSSION

For a driver of a vehicle, or in general for vehicle occupants, the appreciation of an emergency vehicle (EV) sounding a siren signal is difficult and depends on many factors. These factors include wideband noise sources that are present in the vehicle environment, such as air conditioning, engine noise, road/tire and wind noise.

Additionally, movements of EVs, when going to an accident place or leaving it, involve for a listener (in a "sensing vehicle") a modification of perceived siren signal frequencies due to Doppler effect. When an EV is approaching the sensing vehicle, the perceived siren signal has a higher pitch, and when the EV is receding from the sensing vehicle, the perceived siren signal has a lower pitch than a pitch in a static EV case.

Due to these factors, it is difficult for a driver to recognize and localize an EV, and often the driver only recognizes and localizes an EV in close vicinity and definitely when he sees it.

In the prior art, basically a single frequency detection is used for EV recognition which is not robust.

SUMMARY

According to an aspect of this disclosure, a system includes a microphone unit to be mounted in a first vehicle, configured to receive an audio signal from outside the first vehicle, process the audio signal and output a microphone signal, a storage unit storing a database containing, for each siren signal pattern of a plurality of siren signal patterns sounded by second vehicles, components of sparse models respectively corresponding to the plurality of siren signal patterns; and an identifying unit configured to match the microphone signal with the components of the sparse models, and to detect, based on a result of the matching, at least one of the second vehicles sounding a siren signal pattern of the plurality of siren signal patterns.

According to another aspect of this disclosure, a method for a system includes a microphone unit to be mounted in a first vehicle, which receives an audio signal from outside the first vehicle, processes the audio signal and outputs a microphone signal, and a storage unit which stores a database containing, for each siren signal pattern of a plurality of siren signal patterns sounded by second vehicles, components of sparse models respectively corresponding to the plurality of siren signal patterns, the method comprising, matching the microphone signal with the components of the sparse models, and detecting, based on a result of the matching, at least one of the second vehicles sounding a siren signal pattern of the plurality of siren signal patterns.

BRIEF DESCRIPTION OF THE DRAWINGS

The foregoing and additional features and characteristics of this disclosure will become more apparent from the following detailed description considered with the reference to the accompanying drawings, wherein:

FIGS. 6 and 7 show diagrams illustrating examples of siren signal patterns.

FIG. 10 illustrates an expansion of the sparse models with Doppler shifts.

FIG. 11 illustrates an example for best function search within siren signal pattern 1.

FIG. 13 shows a schematic block diagram illustrating an architecture for multiple simultaneous EV localization according to an implementation example of the invention.

FIG. 14 shows a schematic block diagram illustrating processing for multiple simultaneous EV localization according to an embodiment of the invention.

DETAILED DESCRIPTION

Embodiments disclosed here will be described with reference to drawings. This disclosure is not limited to the following embodiments and may be appropriately changed or modified without departing from a subject matter of the disclosure.

Figure 2:
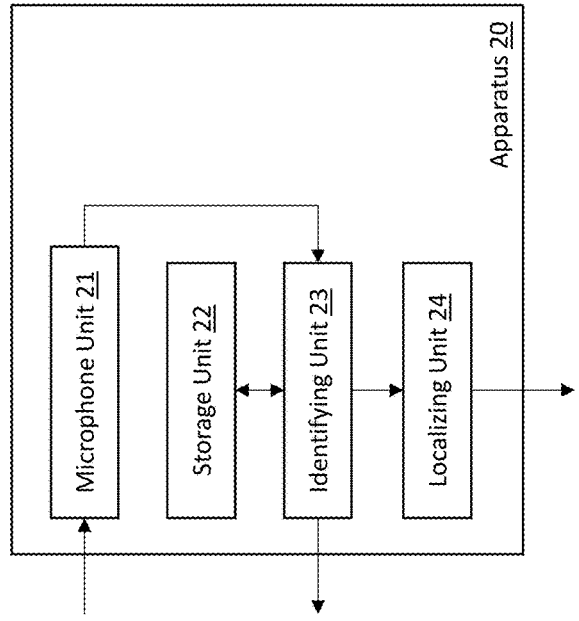
FIG. 2 shows a schematic block diagram illustrating an architecture of a system according to an embodiment of the invention.
Figure 1:
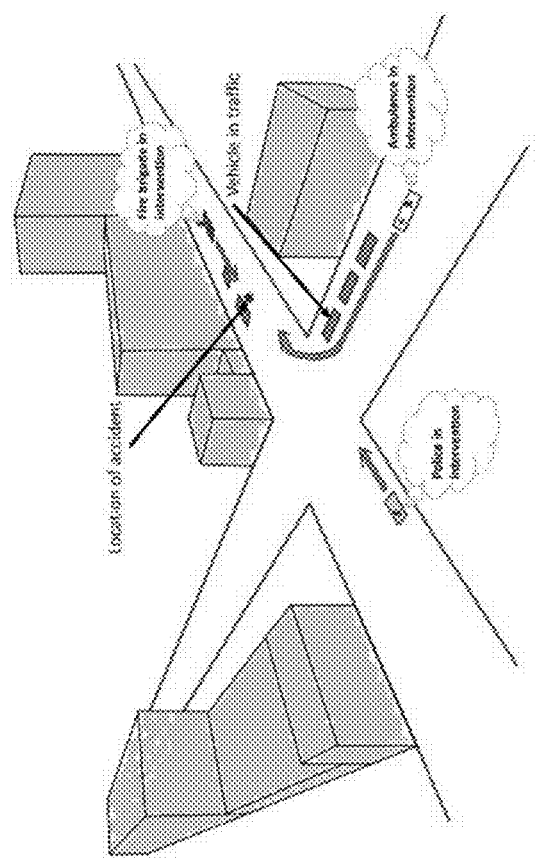
FIG. 1 shows a diagram illustrating an EVs' intervention scenario.

FIG. 2 shows a schematic block diagram illustrating an architecture of a system 20 according to an embodiment of the invention.

The system 20 comprises a microphone unit 21 to be mounted in a vehicle (which is also referred to as first vehicle). The microphone unit 21 receives an audio signal from outside the first vehicle, processes the audio signal and outputs a microphone signal. Here it is assumed that the audio signal is processed in the analog domain, e.g. is amplified and low-pass filtered, and then is converted into the digital domain so that a digital microphone signal is output from the microphone unit 21.

Figure 3:
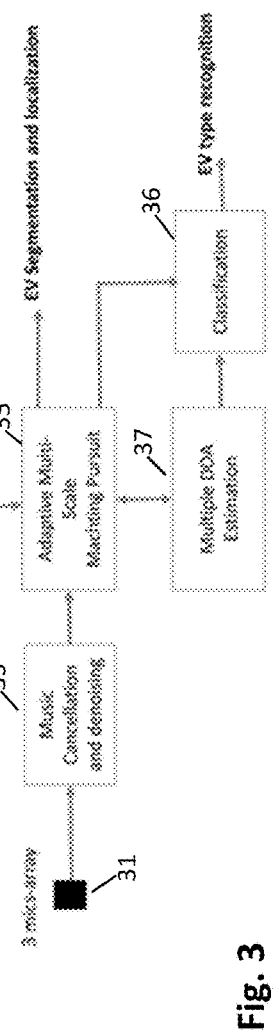
FIG. 3 shows a schematic block diagram illustrating an architecture of a system according to an implementation example of the invention.

According to the implementation example shown in FIG. 3, the microphone unit 21 is a three microphones only in-vehicle setting (three microphones array) 31 which will be described in more detail later on. Of course, usage of more microphones is possible although not necessary.

Referring again to FIG. 2, the system 20 further comprises a storage unit 22 that stores a database containing, for each siren signal pattern of a plurality of siren signal patterns sounded by vehicles such as emergency vehicles (also referred to as second vehicles), components of sparse models respectively corresponding to the plurality of siren signal patterns, which will be described in more detail later on. According to the implementation example shown in FIG. 3, the sparse siren model database 32 functions as the storage unit 22.

The system 20 further comprises an identifying unit 23 that matches the microphone signal with the components of the sparse models, and detects, based on a result of the matching, at least one of the second vehicles sounding a siren signal pattern of the plurality of siren signal patterns, which will be described in more detail later on. According to the implementation example shown in FIG. 3, the identifying unit 23 comprises the functions of blocks 34 to 37.

It is to be noted that while the microphone unit 21 is mounted in the first vehicle, the storage unit 22 and the identifying unit 23 may be located at different sites and communication between the units may be effected over the air.

The system 20 further comprises a localizing unit 24 to be described later on.

Now the implementation example shown in FIG. 3 will be described in more detail. The system illustrated in FIG. 3 comprises the three microphones only in-vehicle setting 31, a noise reduction and music cancellation block 33 which is not part of the subject matter of the present invention, and the sparse siren signal model database 32 that contains basic decompositions for a siren signal patterns or mathematical models (sparse models) block 34. The system further comprises an adaptive multi-scale matching pursuit block 35, a classification block 36 which makes a decision about an EV type (in practice, this decision may be done within the multi-scale matching pursuit block), and a multiple Direction-Of-Arrival (DOA) estimation block 37 which locates and tracks changes in location of multiple EVs simultaneously sounding siren signal patterns.

1) Microphone Unit 21

According to an implementation example of the invention, as a cost-effective and space saving solution an array of only three microphones 31 is used. These microphones are placed in a two-dimensional plane. There are numerous setting possibilities. As an example, three possible settings are illustrated in FIGS. 4A-4C and 5A-5C.

Figure 4A:
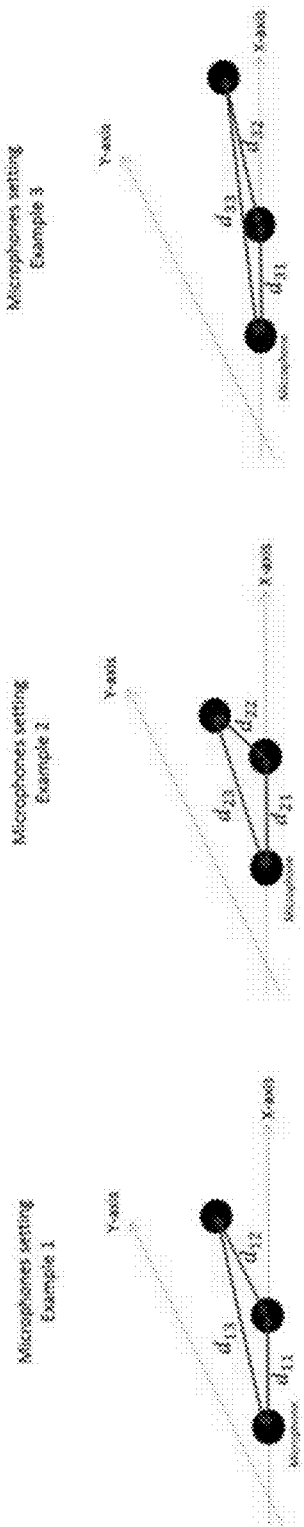
FIGS. 4A to 4C and 5A to 5C show diagrams illustrating examples of microphone settings according to the present invention.
Figure 4B:
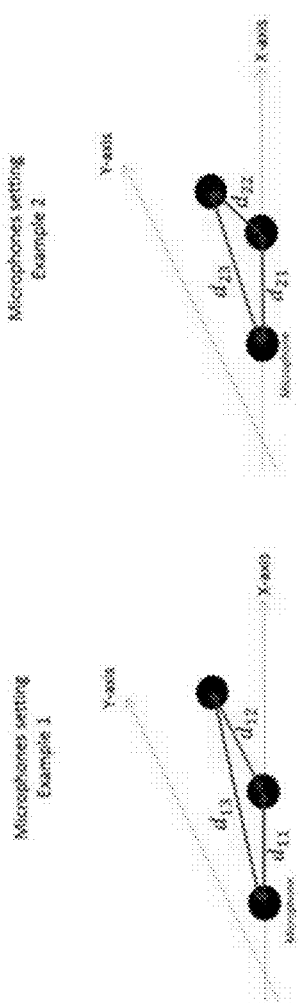
Figure 4C:
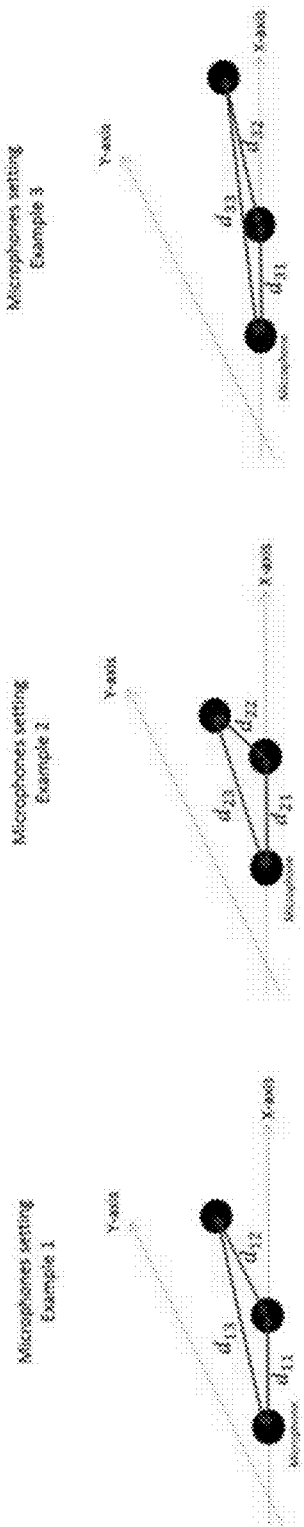
Figure 5A:
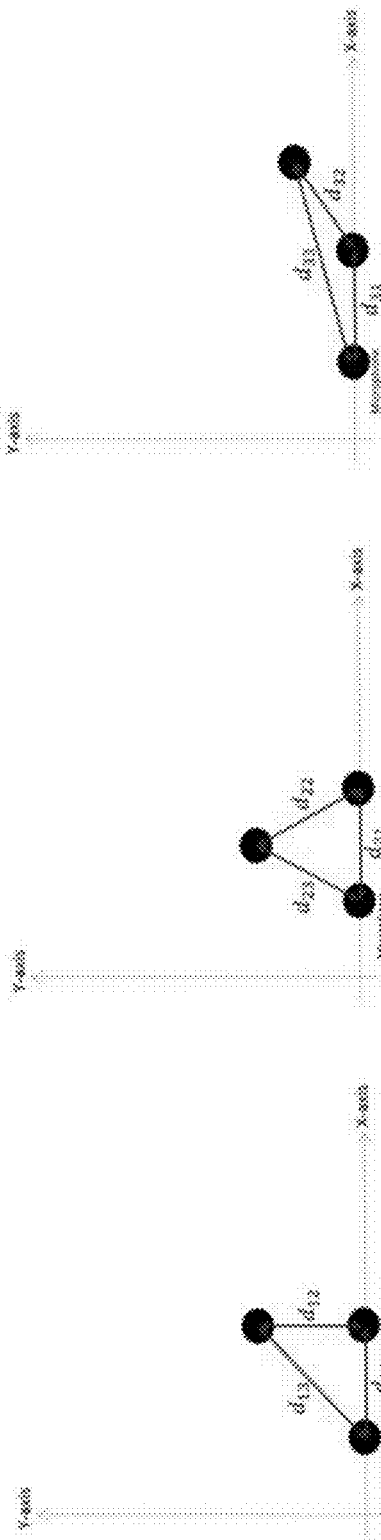
Figure 5B:
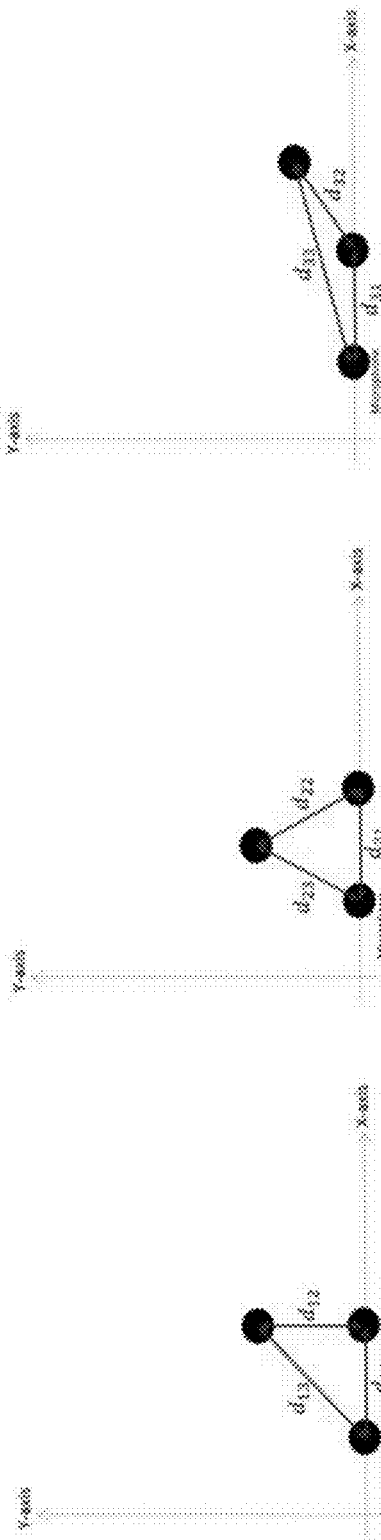
Figure 5C:
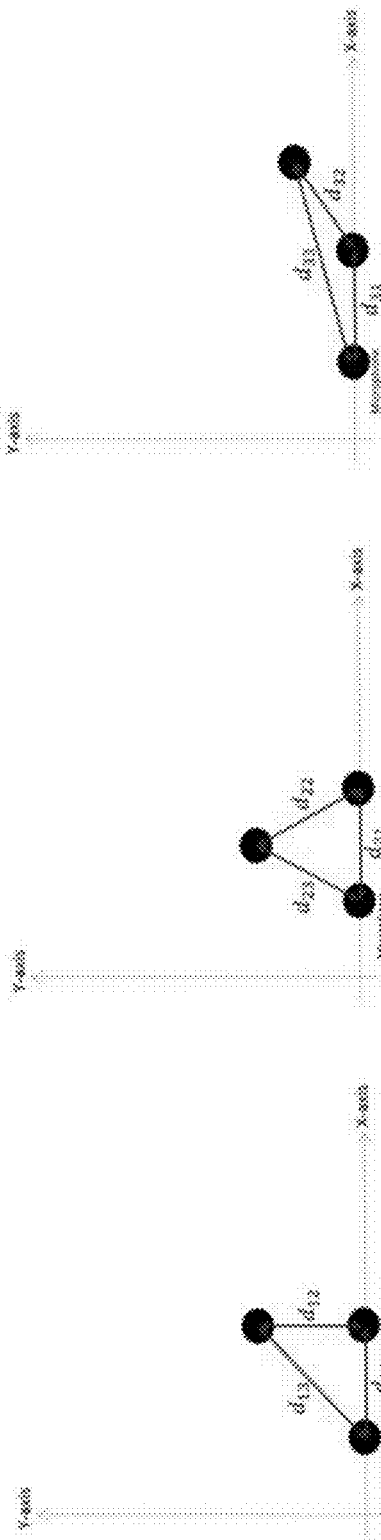

FIGS. 4A-4C show a plane view of settings 1 to 3, and FIGS. 5A-5C show a top view of the same settings. To avoid spatial aliasing, the distances between the microphones are important. Some possible values for example 1 are $d_{11}$=4.5 cm; $d_{21}$=4.5 cm; $d_{13}$=6.36 cm.

The location of the microphones inside the vehicle also does not have a particular limitation. The three microphone setting can be small enough to be easily integrated.

2) Noise Reduction and Music Cancellation Block 33 (Not Part of the Subject Matter of the Present Invention)

If there is some background music/radio, navigation system voice or in general, the vehicle multimedia system is running and emitting audio, then this interference is canceled. After that, the vehicle cabin and environment noises are reduced. The algorithms for music cancellation and vehicle noise reduction are not part of the subject matter of the present invention. According to the present invention it is assumed that the microphone signal output from the microphone unit 21/the three-microphones array 31 have undergone the algorithms for music cancellation and vehicle noise reduction.

3) Storage Unit 22

The storage unit 22 stores a database (e.g. the siren database 32) containing, for each siren signal pattern of a plurality of siren signal patterns, components of sparse models respectively corresponding to the plurality of siren signal patterns.

The simplest EV siren signal pattern is composed by a two tones melody. Each tone has a rich frequency content and lasts a certain time. This may usually be the case for ambulances and fire brigades. More complex EV siren signal patterns can be composed of swept-frequency melodies having also a rich frequency content and a duration. This is often used for police sirens.

These two points explain why using a single frequency detection is not robust at all in order to recognize the EV type.

The siren signal patterns might be different in every country. The database 32 of sparse models can contain all necessary models or be adapted to a particular target country.

FIG. 6 shows an ambulance siren signal pattern and a fire truck siren signal pattern (these patterns are referred to as pattern 1). FIG. 6 represents a time-frequency analysis of siren signals. The x-axis is the time, and the y-axis is the frequency content in a logarithmic scale. Both siren signal patterns are two tones, but the frequency content is different. As can be seen, the harmonic content is not negligible.

FIG. 7 shows several siren signal patterns 2 to 4 used by the police. Patterns 2 to 4 illustrate swept-frequency patterns. FIG. 7 represents a time-frequency analysis of siren signals. The x-axis is the time, and the y-axis is the frequency content in a logarithmic scale. Again, it can be seen that the harmonic content is not negligible. It can also be seen that pattern 4 is composed of a mixture of two different swept-frequency patterns. It is not abnormal that for a given country, the police vehicle has several siren patterns, each one related to some actions (e.g. one siren pattern for emergency intervention, one other for requiring a driver to stop the car, etc.). Therefore, identifying one of the two siren patterns of the pattern 4 example, might be enough to say it is a police vehicle, but identifying the mixture might give the intention of the police.

According to an embodiment of the present invention, siren signals are modeled using a sparse approach. This means that real recordings of siren signals are not compared to some candidate recordings, but models are built using only a few parameters and considering that models have a compact support (only a finite number of points are non-zeroes).

The siren signal patterns are real, discrete (after sampling) and modeled as:

$$S_i = \bigcup_{n=0}^{N} \sum_{k=0}^{K(n)} <S_{i,k}, g_{k,n}> g_{k,n}$$

Where $S_i$ is the siren signal pattern model i (ambulance patterns, police pattern and fire brigade patterns), $S_{i,k}$ is the siren pattern model at kth residual, K(n) is the number of core elements constituting the siren model and depends on the time instant n, N is the number of different time patterns contained in the siren signal, $g_{k,n}$ are the components of the sparse model for the given siren signal pattern, k is the core function number, and <a,b> represents the inner-product between a and b given by the following definition:

$$<a, b> = a^T b = \sum_{m=0}^{M-1} a_m b_m$$

The siren signal patterns are modeled as well in frequency as in time.

The values of $g_{k,n}$ which represent components of a linear expansion of the siren signal pattern are stored in the database 32. For example, in the case of a Fourier analysis, the siren signal patterns are decomposed on basic functions formed by sine and cosine. According to the present invention, the decomposition of the siren signal patterns can be made by whatever function that can faithfully describe the siren signal patterns.

Figure 8:
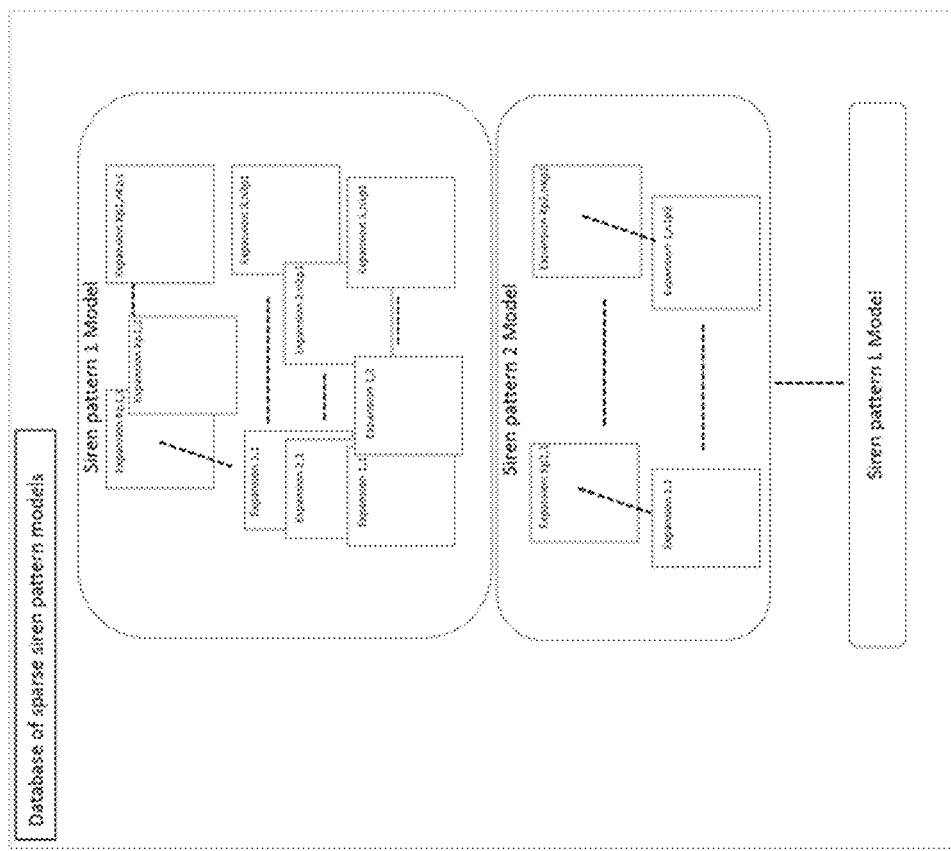
FIG. 8 shows a schematic diagram illustrating an architecture of sparse models of siren signal patterns according to an implementation example of the invention.

FIG. 8 shows an architecture of the database 32 of sparse siren signal pattern models. As can be seen from the FIG. 8, the database 32 is composed of models for each EV siren signal pattern. Each siren signal pattern model is composed by multiple core functions that when combined perfectly model the siren signals. The number of core functions to perfectly model the siren signal may change in time.

For example, for the police siren signal pattern 2, one expansion model Expansion$_{k,n}$ where k and n are as previously the core function number and the time instant, can be described by a form of:

$$\text{Expansion}_{1,1} = \alpha(l)(\cos 2\pi\varphi(l) + \sin 2\pi\varphi(l))$$

Where $\varphi(l)$ is any nonlinear function modeling the instantaneous frequency, l is the discrete time instant and $\alpha(l)$ is a window function to achieve better frequency discrimination. It may be a Bartlett-Hahn window which is described by:

$$a(l) = 0.62 - 0.48\left|\frac{l}{M-1} - \frac{1}{2}\right| - 0.38\cos\left(\frac{2\pi l}{M-1}\right)$$

Where M is the window length. Therefore, the function $\varphi(l)$ can be polynomial, as for example $$\varphi(l) = \{f_0 c_1 l + c_2 l^2 + \ldots + c_p l^p\}$$

or logarithmic, exponential or of any suitable type. Thus, from this approach there is no limit to the model complexity. However, the length of the function is an important parameter too. The length of one core function is adjusted to maximize time and frequency resolution. Each core function may have a different length.

Figure 9:
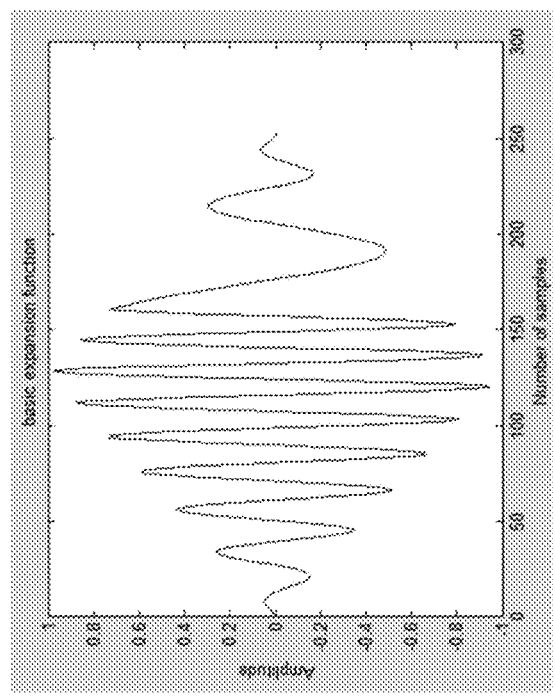
FIG. 9 shows a diagram illustrating an example of an expansion function for the sparse models.

FIG. 9 shows an example of one database expansion function, which constitutes an element of the EV siren signal.

Expansion functions are found for all target EV siren patterns, however they are not yet robust to Doppler effect. As mentioned above, when sources are moving, the perceived siren signal has a different frequency content than in static condition. Therefore, according to an embodiment of the invention, warped versions of the defined models are added to the database 32.

In FIG. 10, on the left side it is shown that the database of models is completed for each siren signal pattern, and for all expansion functions of this siren signal pattern by a Doppler shift when the EV sounding the siren signal pattern is approaching and receding up to a speed of 150 km/h.

The right side of FIG. 10 shows a time-frequency representation of a siren signal pattern model when the EV is static (bottom curve), and when the EV is approaching at 90 km/h the model is warped at higher frequency content.

The instantaneous frequency is modified by changing the computed frequency by:

$$f_{inst}(l) = \left[\frac{c}{c - V_{EV}}\right] f_{model\;static} \text{ when EV approaching}$$

$$f_{inst}(l) = \left[\frac{c}{c + V_{EV}}\right] f_{model\;static} \text{ when EV receding}$$

Where c is the sound speed (e.g. 346 m/s) and $V_{EV}$ is the EV speed in m/s.

In these expressions, $f_{model\;static}$ is not limited to a single frequency value and changes in time following the sparse model.

4) Identifying Unit 23 (Multi-scale Matching Pursuit Block 35 and Classification Block 36)

As mentioned above, according to the present invention it is assumed that music is cancelled and vehicle environment noises are reduced. With the embodiment of the present invention, a classification (i.e. decision which EV is present) can be achieved within a Matching Pursuit algorithm.

The Matching Pursuit is an algorithm that creates an adaptive time-frequency decomposition of a signal. According to the present invention, this algorithm is adapted to achieve:

a detection and recognition of an EV; and
an iteration until all EVs are found.
a delivery to localizing unit 24 of remodeled detected and recognized EVs The database 32 of expansion functions is used in order to achieve the detection and recognition of the EV. A noise-free signal output from the microphone unit 21 (e.g. the three-microphones array 31) is projected on the expansion functions contained in the database 32 and a search is achieved to find which element maximizes the inner-product <Signal, Expansion Function>.

The processing steps are the following:

a. A criteria is used to combine multiple expansion functions for the detection. One possible criteria candidate (but not limited to) is:

$$\delta = \frac{\sqrt{\sum_{k=0}^{K} <M_p, g_{k,p}>^2}}{\prod_k \|g_{k,p}\|}$$

Where $M_p$ is the processed microphone signal output from the three-microphones array 31 at iteration p and $g_{k,p}$ is the expansion function at iteration p. $\delta$ is the pseudo-instantaneous criteria. This means that as a first element of recognition, it detects part of the siren signal pattern, however since the siren signal pattern has a certain length, the confirmation of the EV type is made later.

b. Find the best matching combination through the warped expansion function. This also enables an estimation of the Doppler shift. The expansion function database 32 has three dimensions, i.e. for all siren signal patterns: warped frequency content expansion functions and time-adaptive expansion function.

The list of possible candidates is given by the following equation:

$$P = \underset{W}{\mathrm{argmax}} \{\delta_{i,w,k} > \gamma\}$$

Where P is the list of siren signal pattern candidates, $\delta_{i,w,k}$ is the pseudo-instantaneous criteria for siren pattern i, warped function w and time function k. $\gamma$ is a minimum threshold above which value a siren signal pattern candidate must be.

For further explanation, the following diagram is given. FIG. 11 describes graphically how the list P is obtained. When the siren signal is perceived by the microphone unit 21, i.e. when the siren signal is above a minimum microphone sensitivity, it is not known at what specific time the siren signal is sounded. Therefore, it is needed to find the adequate time instant, which is shown in the left part of FIG. 11.

At the same time, considering that the sensing vehicle (first vehicle) is moving and the EV (second vehicle) is also moving, it is needed to find the warped function that best models the siren signal for this laps of time (the laps of time depends on the expansion function length, which can be from 10 ms to 1 s, for example).

The previous operation is repeated for all siren signal patterns in the database. If the criteria is greater than a given threshold, then the candidate is kept. At this level it is assumed that interferences from passenger or driver talk are possible. This may lead to false candidates in the list P that are removed in a further step.

c. Find the best matching combination through all siren signal patterns. This is done by maximizing the candidate list P through all siren signal patterns. Only the best candidate is kept. Therefore the total maximization (including the previous search) is given by:

$$C = \underset{S}{\mathrm{argmax}} \left\{ \underset{W}{\mathrm{argmax}} \{\delta_{i,w,k} > \gamma\} > \beta \right\}$$

Where C is the estimated EV siren signal type (the identified siren signal pattern) through the list P of possible siren signal patterns S, and $\beta$ is the threshold. Once C is found, the following is known:
 The type of EV
 The instant the siren signal pattern begins and ends (time segmentation or detection)
 The speed (or relative speed) of the EV and the information if it is approaching or receding.

d. Since the first EV (first siren signal pattern) is identified, it is needed to check if there are some other EVs, i.e. some other siren signal patterns, that were mixed. There is a high probability that siren signal patterns have some overlapping frequency content, even in the sparse decomposition. Therefore, in a next step the detected signal is removed from the microphone signal that is under processing. This is achieved by the following expression:

$$M_{p+1} = M_p - \bigcup_{n=0}^{N} \sum_{k=0}^{K(n)} <M_p, g_{k,n}> g_{k,n}$$

This means that to get a processed microphone signal at a next algorithm iteration $M_{p+1}$, the detected siren signal pattern type is removed from the microphone signal.

Figure 12:
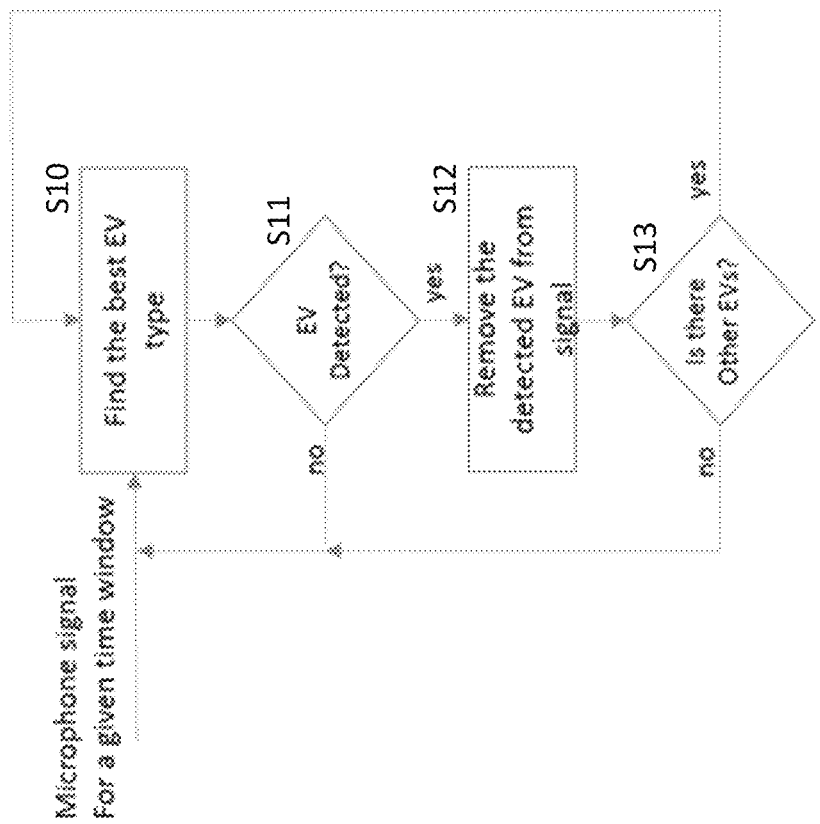
FIG. 12 shows a flow chart illustrating a process of identifying siren signal patterns according to an embodiment of the invention.

This principle is illustrated by the process shown in FIG. 12. In step S10, for a current time period, the above-described steps a.-c. are performed on the microphone signal for a given time window. In step S11, it is checked if an EV, i.e. a siren signal pattern, has been detected/identified. If Yes in step S11, the process proceeds to step S12 in which above-described step d. is performed, and step S13 follows. Otherwise, the process is stopped for the current time period.

In step S13, it is checked if there are other EVs, i.e. other siren signals, present in the microphone signal. If the remaining microphone signal is above a threshold that considers that there is only noise, then the algorithm returns to step S10. If the remaining microphone signal is below the threshold then the algorithm is stopped for the current time period and all the EV types (with instants, speed and basic orientation as approaching or receding) are delivered to a higher level processing and to the localizing unit 24 which performs precise multi-source localization.

5) Multiple Simultaneous EV Localization (Localizing Unit 24)

According to the present invention, there are two possible approaches to localize multiple simultaneous EVs:
 Blind by using directly the microphone signals (after noise reduction and music cancellation) output from the microphone unit 21
 By using decomposition performed in the previous step with the multi-scale matching pursuit algorithm.

Basically, the algorithm architecture is the same for both cases. The difference is that if the approach is completely blind, a maximum number of simultaneous sources that can be localized is two (in the case of a three-microphone array). If the decomposition is used from the matching pursuit process, then all existing EVs can be localized.

The algorithm uses a combination of adaptive filters to discriminate direction from microphone pairs and separate the left and right side from the given pair.

FIG. 13 shows an architecture of a multiple simultaneous EV localization process according to an implementation example of the invention. All three microphones of the three-microphones array are used to maximize the localization precision. Three different adaptive filters are used to estimate a delay between signals arriving at the microphones. EVs are at a minimum distance of 2 meters from the sensing vehicle (first vehicle), and therefore only plane wave propagation is considered.

The adaptive filters are separated into left part and right part coefficients. Peaks in these coefficients are delay estimates between signals on microphone pairs. These peaks are used to make a decision about the localization in two dimensions. Possible microphone pairs are (Microphone 1, Microphone 2), (Microphone 2, Microphone 3) and (Microphone 1, Microphone 3). Two pairs are enough to localize an EV in two dimensions, provided that the third pair can also be used to avoid any ambiguity.

In an effort to localize all EVs, according to an embodiment of the invention a combined approach is adopted, that uses the multi-scale matching pursuit signal decomposition process together with the multiple simultaneous EV localization process as described in FIG. 13. That is, with a three-microphones arrangement, according to the invention even four or more EVs, i.e. each EV sounding a recognized siren signal pattern, can be localized.

FIG. 14 shows a schematic block diagram illustrating processing for multiple simultaneous EV localization according to an embodiment of the invention.

In each step of the multi-scale matching pursuit process as described above and performed in blocks 131-133 of FIG.

14, a 2-dimensions source localization block 134 serving as the localizing unit 24 receives three inputs that are defined by:

$$\begin{cases} S_1 = \bigcup_{n=0}^{N} \sum_{k=0}^{K(n)} <M_{1,p}, g_{k,n}> g_{k,n} \\ S_2 = \bigcup_{n=0}^{N} \sum_{k=0}^{K(n)} <M_{2,p}, g_{k,n}> g_{k,n} \\ S_3 = \bigcup_{n=0}^{N} \sum_{k=0}^{K(n)} <M_{3,p}, g_{k,n}> g_{k,n} \end{cases}$$

Where $S_1$, $S_2$ and $S_3$ are the outputs of the previously described matching pursuit algorithm performed in blocks 131-133 and the inputs of block 134. These signals are the reconstructed identified siren pattern microphone signals from sparse models, and $M_{1,p}$, $M_{2,p}$ and $M_{3,p}$ are the decomposed microphone signals at pth iteration. Each iteration p delivers a recognized EV from the mixture.

Since only one EV at a time is localized, due to the combined processing, the precision is high and there is no ambiguity about the localization in two dimensions. The localization of all existing EV sources is made iteratively, as the matching pursuit algorithm iterates.

When the multi-scale matching pursuit process, classification of EV type process and multiple simultaneous EV localization process are running simultaneously, as long as the EVs are sounding the siren signals and the siren signals are being perceived by the sensing vehicle, the driver of the sensing vehicle can get a reliable information about all EVs, at the moment they occur with their type, speed, localization and the information whether they are approaching or receding.

Figure 15:
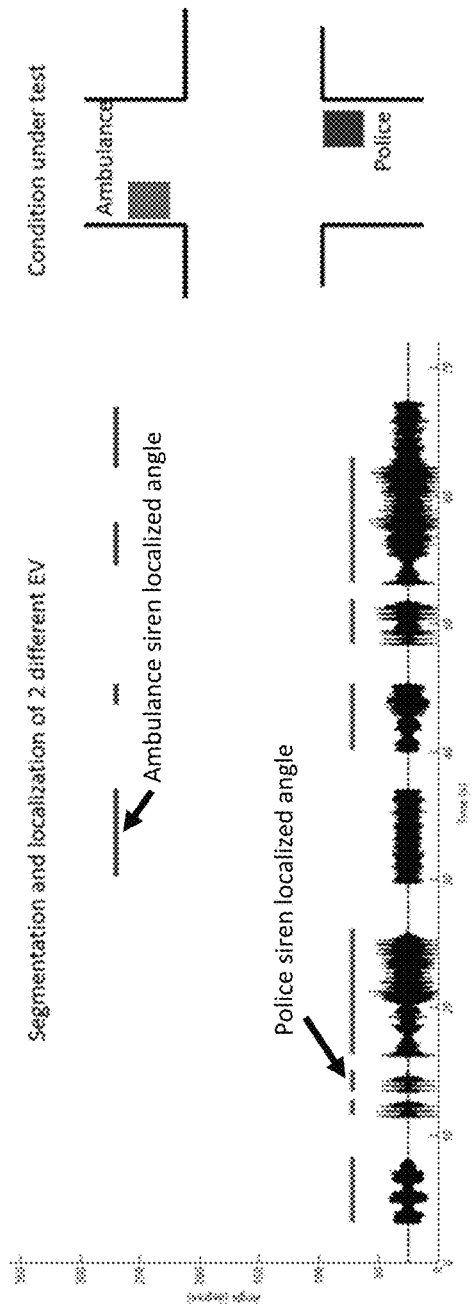
FIG. 15 illustrates results of recognizing and localizing EVs according to an embodiment of the invention.

FIG. 15 shows results for a case where there are two EVs sounding siren signal patterns that occur separately and simultaneously. There are a police siren signal and an ambulance siren signal. The police siren signal is recognized and localized at an angle about 72 degrees, which means the police is behind the sensing vehicle. Time-varying instants (segmentation) and position are shown in FIG. 15.

The ambulance siren signal starts after 30 s and is localized at an angle about 270 degrees, which means that the ambulance is in front, left of the sensing vehicle. The time instants and position are shown in FIG. 15.

That is, simultaneous EV events occur and they are recognized and localized.

Figure 16:
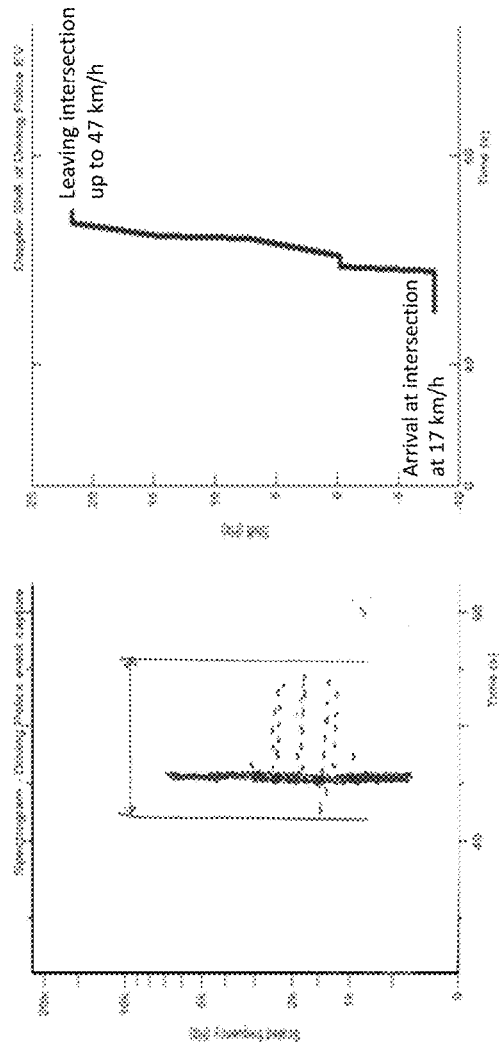
FIG. 16 illustrates EV speed estimation according to an embodiment of the invention.

FIG. 16 shows a case when a police car is passing an intersection and its speed is estimated using the previously described principle. The left part of FIG. 16 is a time-frequency analysis of a noise reduced police siren signal pattern. The right part of FIG. 16 shows Doppler shift estimates. The sign of the Doppler shifts in the illustrated convention simply inform about an approaching (negative sign) or receding (positive sign) EV. In the case shown in FIG. 16, the police car arrived at the intersection at a speed of 17 km/h and when passing then accelerates up to 47 km/h.

According to an embodiment of the invention, multiple simultaneous EV recognition with speed estimation is provided, that uses a sparse representation of siren signal patterns that are used in a multi-scale matching pursuit algorithm. Further, according to an embodiment of the invention, multiple simultaneous EV localization based on a combination of matching-pursuit iterations and delay estimation between microphone pairs is provide. According to an implementation example, a microphone setting using only three microphones inside the sensing vehicle is adopted.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A system comprising:
a microphone unit to be mounted in a first vehicle, configured to receive an audio signal from outside the first vehicle, process the audio signal and output a microphone signal;
a storage unit storing a database containing, for each siren signal pattern of a plurality of siren signal patterns sounded by second vehicles, components of sparse models respectively corresponding to the plurality of siren signal patterns; and
an identification unit configured to match the microphone signal with the components of the sparse models, and to detect, based on a result of the matching, at least one of the second vehicles sounding a siren signal pattern of the plurality of siren signal patterns.

2. The system of claim 1, wherein the identification unit is configured to match the microphone signal with the components of the sparse models at time-varying instants of the microphone signal, identify the siren signal pattern sounded by the at least one second vehicle based on a result of the matching, and recognize the at least one second vehicle based on the identified siren signal pattern.

3. The system of claim 1, wherein
the database contains at least two warped versions of the sparse models, and
the identification unit is configured to match the microphone signal with the components of each version of the sparse models at time-varying instants of the microphone signal, and, based on the matching result,
identify the siren signal pattern sounded by the at least one second vehicle and recognize the at least one second vehicle based on the identified siren signal pattern, and/or
detect an instant of time at which the identified siren signal pattern begins, and/or
detect speed of the at least one second vehicle and/or whether the at least one second vehicle is approaching or receding the first vehicle.

4. The system of claim 1, wherein the identification unit is configured to subtract a remodeled siren signal that is remodeled from sparse models corresponding to the identified siren signal pattern from the microphone signal and continue the matching of the microphone signal, from which the remodeled siren signal has been removed, with the components of the sparse models.

5. The system of claim 1, further comprising:
a localization unit,
wherein the microphone unit comprises at least three microphones each outputting a microphone signal, the identification unit is configured to perform the matching for each of the at least three microphone signals and output a remodeled siren signal from sparse models corresponding to the identified signal pattern at a timing corresponding to the timing of each of the at least three microphone signals to the localization unit, and the localization unit is configured to localize the at least one second vehicle based on differences between timings of the at least three microphone signals.

6. The system of claim 1, wherein the microphone unit comprises a first microphone, a second microphone and a third microphone, which are arranged in a plane and respectively output a first microphone signal, a second microphone signal and a third microphone signal, the identification unit is configured to perform the matching of the microphone signal for each of the first microphone signal, the second microphone signal and the third microphone signal, identify the siren signal pattern sounded by the at least one second vehicle based on results of the matching and output a remodeled siren signal from sparse models corresponding to the identified siren signal pattern at a first timing corresponding to a timing of the first microphone signal, output a remodeled siren signal from sparse models at a second timing corresponding to a timing of the second microphone signal and output a remodeled siren signal from sparse models at a third timing corresponding to a timing of the third microphone signal, and the system further comprises a localization unit configured to localize the at least one second vehicle based on differences between the first, second and third timings.

7. The system of claim 5, wherein the localization unit is configured to track changes of location of the at least one second vehicle based on the remodeled siren signal continuously output by the identification unit for each of the at least three microphone signals.

8. The system of claim 1, wherein the identification unit is configured to match the microphone signal over a predetermined time window with the components of the sparse model generated with respect to the predetermined time window.

9. A method for a system comprising a microphone unit to be mounted in a first vehicle, which receives an audio signal from outside the first vehicle, processes the audio signal and outputs a microphone signal, and a storage unit which stores a database containing, for each siren signal pattern of a plurality of siren signal patterns sounded by second vehicles, components of sparse models respectively corresponding to the plurality of siren signal patterns, the method comprising:

matching the microphone signal with the components of the sparse models; and detecting, based on a result of the matching, at least one of the second vehicles sounding a siren signal pattern of the plurality of siren signal patterns.

10. The method of claim 9, wherein the matching comprises:

matching the microphone signal with the components of the sparse models at continuous instants of time of the microphone signal;

identifying the siren signal pattern sounded by the at least one second vehicle based on a result of the matching; and recognizing the at least one second vehicle based on the identified siren signal pattern.

11. The method of claim 9, wherein the database contains at least two warped versions of the sparse models, and the method comprises:

matching the microphone signal with the components of each version of the sparse models at continuous instants of time of the microphone signal, and, based on the matching result, identifying the siren signal pattern sounded by the at least one second vehicle and recognizing the at least one second vehicle based on the identified siren signal pattern, and/or detecting an instant of time at which the identified siren signal pattern begins, and/or detecting speed of the at least one second vehicle and/or whether the at least one second vehicle is approaching or receding the first vehicle.

12. The method of claim 9, comprising:

subtracting a remodeled siren signal that is remodeled from sparse models corresponding to the identified siren signal pattern from the microphone signal and continuing the matching of the microphone signal, from which the remodeled siren signal has been removed, with the components of the sparse models.

13. The method of claim 9, wherein the microphone unit comprises at least three microphones each outputting a microphone signal, and the method comprises:

performing the matching for each of the at least three microphone signals and outputting a remodeled siren signal from sparse models corresponding to the identified signal pattern at a timing corresponding to the timing of each of the at least three microphone signals; and localizing the at least one second vehicle based on differences between timings of the at least three microphone signals.

14. The method of claim 9, wherein the microphone unit comprises a first microphone, a second microphone and a third microphone, which are arranged in a plane and respectively output a first microphone signal, a second microphone signal and a third microphone signal, and the method comprises:

performing the matching of the microphone signal for each of the first microphone signal, the second microphone signal and the third microphone signal;

identifying the siren signal pattern sounded by the at least one second vehicle based on results of the matching;

outputting a remodeled siren signal from sparse models corresponding to the identified siren signal pattern at a first timing corresponding to a timing of the first microphone signal, outputting a remodeled siren signal from sparse models at a second timing corresponding to a timing of the second microphone signal and outputting a remodeled siren signal from sparse models at a third timing corresponding to a timing of the third microphone signal; and localizing the at least one second vehicle based on differences between the first, second and third timings.

15. The method of claim 13, further comprising:

tracking changes of location of the at least one second vehicle based on the remodeled siren signal continuously output for each of the at least three microphone signals.

16. The method of claim 9, the matching comprising:
matching the microphone signal over a predetermined time window with the components of the sparse model generated with respect to the predetermined time window.

17. A computer program product including a program for a processing device, comprising software code portions for performing the steps of claim 9 when the program is run on the processing device.

18. The computer program product according to claim 17, wherein the computer program product comprises a computer-readable medium on which the software code portions are stored.

19. The computer program product according to claim 17, wherein the program is directly loadable into an internal memory of the processing device.

* * * * *